United States Patent

Heirbaut et al.

[15] 3,646,575

[45] Feb. 29, 1972

[54] COIN-OPERATED APPARATUS AND SIGNALLING SYSTEM

[72] Inventors: Edmond Marie Heirbaut, Melseie-Waas; Raymond Francis Andrian Fabre, Wilrijk; Josephus Henricus Karel Camps, Edegem; Michael Marcel Mees, Londerzeel, all of Belgium

[73] Assignee: International Standard Electric Corporation

[22] Filed: Dec. 3, 1969

[21] Appl. No.: 879,958

Related U.S. Application Data

[62] Division of Ser. No. 602,096, Dec. 15, 1966, abandoned.

[52] U.S. Cl. ........................................................179/6.3 R

[51] Int. Cl. ........................................................H04m 17/00

[58] Field of Search ......................................179/6.3, 84 VF

[56] References Cited

UNITED STATES PATENTS

| | | | |
|---|---|---|---|
| 3,131,264 | 4/1964 | Chittleburgh et al. | 179/84 VF |
| 2,686,227 | 8/1954 | Ryall | 179/84 VP |
| 2,794,860 | 6/1957 | Scholten et al. | 179/84 VF |
| 3,098,179 | 7/1963 | Van Rossum et al. | 179/84 VF |

FOREIGN PATENTS OR APPLICATIONS

| | | | |
|---|---|---|---|
| 916,690 | 1/1963 | England | 179/6.3 |
| 1,189,595 | 3/1965 | Germany | 179/6.3 |

*Primary Examiner*—Kathleen H. Claffy
*Assistant Examiner*—Tom D'Amico
*Attorney*—C. Cornell Remsen, Jr., Rayson P. Morris, Percy P. Lantzy, J. Warren Whitesel, Phillip Weiss and Delhert P. Warner

[57] ABSTRACT

A telephone pay station central system in which answering of a call originated at the pay station causes the generation of a signal from the central office to the pay station to connect the coil collection and value-indicating network to the line loop. A coin collection relay is thereby energized to collect a coin and to cause a pulse to be returned to the central office indicating that the call can continue. Periodic back-and-forth signalling continues as necessary during the conversation period without disrupting the conversation.

3 Claims, 19 Drawing Figures

INVENTORS
E. M. F. A. Heirbaut - R. F. Fabre
J. H. K. Camps - M. M. Mees

ATTORNEY
James B. Raden

COIN-OPERATED APPARATUS AND SIGNALLING SYSTEM

This case is a division of Ser. No. 602,096 filed Dec. 15, 1966, now abandoned.

The present invention relates to a coin-operated apparatus, e.g., for telephony, including a balance for verifying the weight of a coin deposited in an associated coin channel said coin rolling on said balance which is pivotable around a fixed axle parallel to the coin path by an amount depending on the coin weight up to a maximum fixed angle.

Such a coin-operated apparatus is known from the Belgian Pat. No. 579,376.

A general object of the invention is to realize an improved balance arrangement by having the coins undergoing a test, supported at two diametrically opposite ends.

The present coin-operated apparatus is characterized by the fact, that said coin channel assumes at its upper side on top of said balance a staircase shape with two steps establishing two possible guidance paths for the upper part of said coin, a coin of lightweight being guided by the first of said two guidance paths to a deflector means deflecting the light coin into a rejector means, a coin of normal weight guided by the second of said two guidance paths pursuing its way to acceptance means and a coin of heavy weight falling out of said two guidance paths being routed to said rejector means.

The present invention also relates to a coin-operated apparatus, e.g., for telephony, including eddy current test means associated to a coin channel for applying an eddy current test to coins in said channel.

Such a coin-operated apparatus is known from the U.S. Pat. No. 3,169,625.

Another object of the present invention is to provide a coin-operated apparatus including improved and simple eddy current test means.

According to another aspect of the invention a coin-operated apparatus, including eddy current test means associated to a coin channel for applying an eddy current test to coins in said channel, is characterized by the fact, that said eddy current test means are constituted by a magnetic means located on a sidewall of said channel and by a diverting means which follows said magnetic means in the coin way, and that a coin leaving the eddy current area strikes on said diverting means and depending on its velocity it is diverted to a rejector means or it normally pursues its way.

The present invention further relates to a coin cashbox.

A further object of the invention is to provide a coin cashbox with increased coin capability.

The present coin cashbox is characterized by the fact, that it comprises at least one deflecting member placed in said box in such a manner that a coin falling into said cashbox strikes on said deflecting member and it is deviated from its falling way.

The present invention still relates to a coin-operated telephone apparatus including a movable hook lever for supporting the telephone handset.

Still another object of the invention is to realize a simple and efficient antifraud mechanism for coin-operated telephone apparatus.

The present coin-operated telephone apparatus is characterized by the fact that said hook lever is elastically coupled to a second movable lever having a great moment of inertia on which at least one delayed closure mercury contact making part of the circuit of said apparatus is secured in such a way that a quick and small movement of said hook lever causes a relative large movement of said second lever and a modified condition of said mercury contact for at least a predetermined duration.

The present invention also relates to a coin-operated apparatus including a number of coin channels accepting coins of corresponding determined values and individual to each of said channels coin value indicating means.

Such a coin-operated apparatus is known from the U.S. Pat. No. 3,023,275.

Another object of the present invention is to provide a coin-operated apparatus having simple coin value indicating means which are directly operated by corresponding coins falling in their chute way.

According to another aspect of the invention a coin-operated apparatus including a number of coin channels accepting coins of corresponding determined values and individual to each of said channels coin value indicating means is characterized by the fact, that the coin value indicating means associated to a coin channel is constituted by a coin-operable contact of which a movable member is coupled to a pulsing arm carrying one or more pulsing projections situated in the respective coin path in such a way that a coin knocking against said one or more pulsing projections in its coin path causes a number of condition changes of the movable member of said contact thereby one or more pulses to be produced for indicating the value of said coin.

The present invention further relates to a signalling system, e.g., for coinbox telephony, in which a signal receiver receives signals from a signal transmitter through a DC loaded line.

Such a signalling system is known from the U.S. Pat. No. 2,935,567.

A further object of the present invention is to provide a signalling system of the above type with the signal receiver independent from the line loop resistance.

The present signalling system is characterized by the fact, that said receiver includes an impedance of constant voltage characteristic in series with the low DC impedance input of a network, e.g., a transformer, preventing a DC coupling between its input and its output in the transmission path and a bistate device coupled across said impedance of constant voltage characteristic through a normally nonconductive switching device, e.g., transistor, which is operable from the output of said network, and that upon a signal being received from said transmitter said bistate device is activated by a current which is independent of the line loop resistance.

The above-mentioned and other objects and features of the invention will become more apparent and the invention itself will be best understood by referring to the following description of embodiments taken in conjunction with the accompanying drawings in which.

Figure 1:
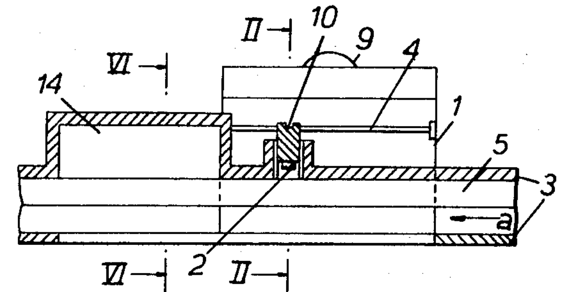
FIG. 1 is a cross-sectional view of a coin-operated apparatus part in accordance with the invention, taken along the line I—I in FIG. 2.
Figure 2:
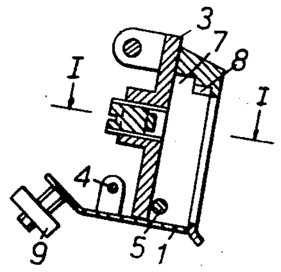
FIG. 2 is a cross-sectional view taken along the line II—II in FIG. 1.
Figure 3:
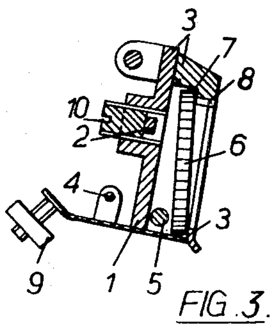
FIG. 3, 4 and 5 show the coin-operated apparatus part of FIG. 2 in three respective characteristic conditions of operation.
Figure 4:
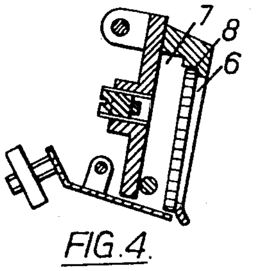
Figure 5:
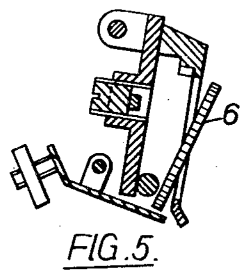
Figure 6:
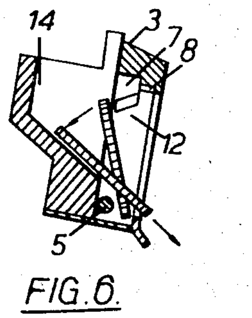
FIG. 6 is a cross-sectional view taken along the line VI—VI in FIG. 1.
Figure 7:
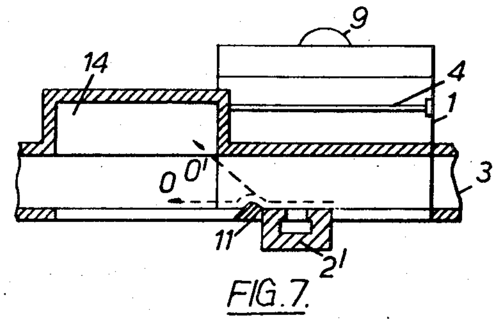
Figure 8:
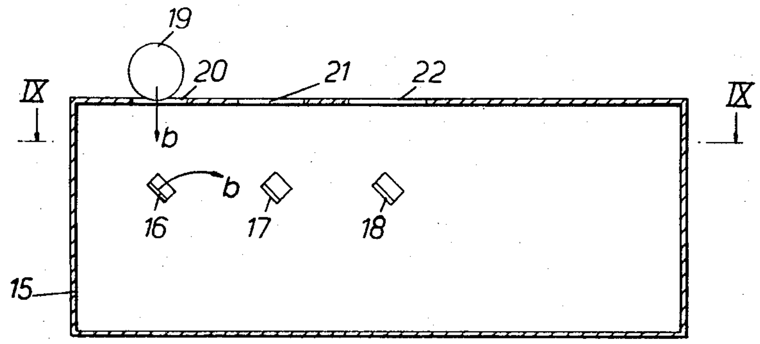
Figure 9:
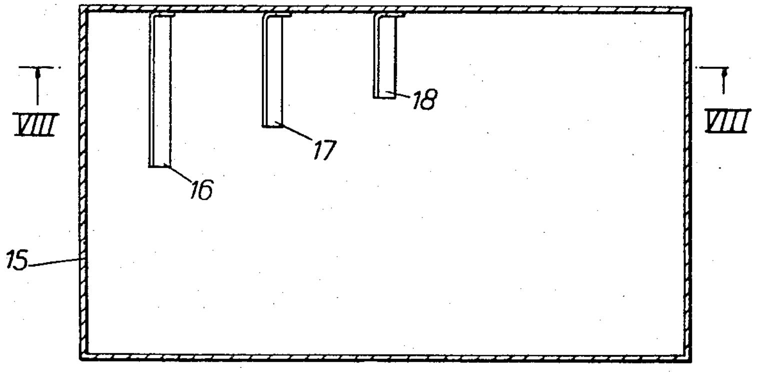
Figures 10, 11:
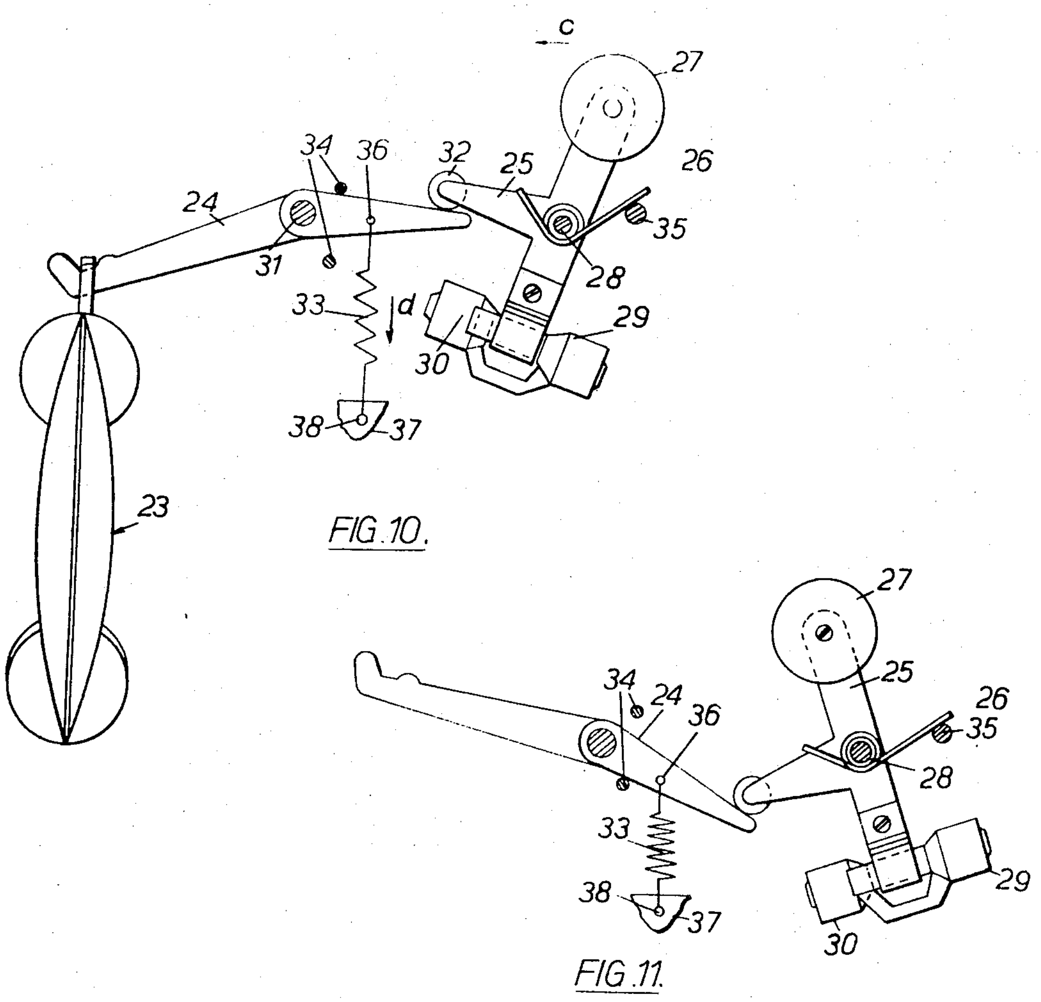
Figure 13:
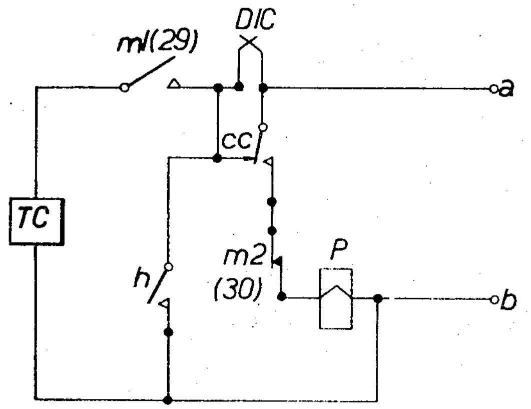
Figure 12:
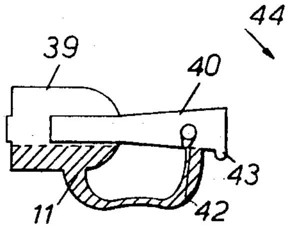
Figure 14:
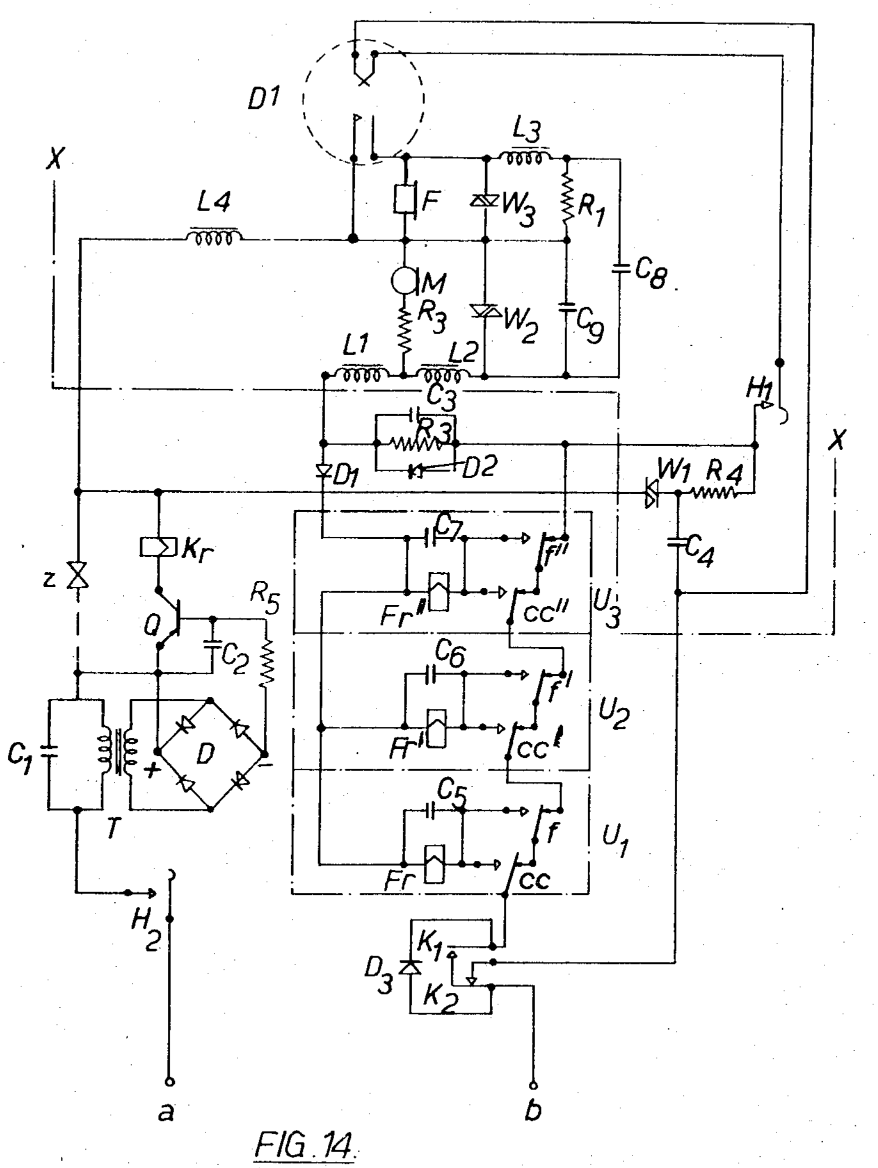

FIG. 7 schematically shows another realization in accordance with the invention, of the magnetic test means included in the coin-operated apparatus part of FIG. 1;

FIG. 8 is a cross-sectional view of a coin cashbox, in accordance with the invention, taken along the line VIII—VIII in FIG. 9;

FIG. 9 is a cross-sectional view taken along the line IX—IX in FIG. 8;

FIG. 10 and 11 schematically show an antifraud hook mechanism of a coin-operated telephone apparatus in accordance with the invention, in the rest and operated condition respectively;

FIG. 12 schematically represents a delayed closure mercury contact;

FIG. 13 shows a circuit relative to the coin-operated telephone part of FIGS. 10 and 11;

FIG. 14 shows a signalling system in accordance with the invention, which is associated to a coin-operated telephone apparatus;

FIG. 15 to 19 schematically represent a coin contact of a coin-operated apparatus in accordance with the invention in characteristic conditions of operation.

Referring to FIGS. 1 to 6 the part of the coin-operated apparatus shown therein, includes a balance 1 and a coin-testing magnet 2, which are associated to a coin channel 3. The coin channel 3, which further includes a calibrated coin inlet (not shown), is slightly inclined in the sense of the coin path indicated by the arrow *a* (FIG. 1), so that a coin introduced in this channel 3 moves by gravity action in the sense of the above arrow *a*. The balance 1, part of which is located in the coin path, is pivotable around a fixed axle 4 under the weight of a coin 6 (FIG. 3 to 5) rolling on the above balance part, by an amount depending on the coin weight. The coin channel 3 which is also slightly inclined towards the right, assumes on the top of the balance 1, a staircase shape with two steps 7 and 8 constituting two possible guidance paths for the coin 6. The balance 1 is adjusted by means of its counterweight 9 in such a way, that a coin 6 of normal weight (FIG. 4) pivots the balance 1 to a normal position and it is guided by the guidance path 8 to acceptance means (not shown), whereas a coin 6 of lightweight (FIG. 3) pivots the balance 1 insufficiently or not at all and it is guided by the path 7. A coin 6 of heavy weight (FIG. 5) pivots the balance 1 more than the normal, so that it falls out of the normal guidance path 8 into a rejector means (not shown). The coin-testing magnet 2 is secured on a screw 10 enabling the adjustment of the distance of this magnet 2 to the coin path, thus of the strength of the magnetic field exercised to the coins rolling in the coin path in front of the magnet 2. The above adjustment is so made that a magnetizable coin of normal weight, guided by the guidance path 8, is attracted to the guidance path 7 upon reaching the position of the magnet 2 in its coin path. All the coins guided by the guidance path 7 are caught by a deflector 12 (FIG. 6) which deflects them to a second deflector 14 from which they slide into the previously mentioned rejector means (not shown). A cylindrical bar 11 parallel to and normally resting near the bottom part of the coin channel 3 is displaceable by means of an associated lever (not shown) parallelly to the sidewalls of the channel 3, thus providing clearance from magnetizable coins eventually stuck on the magnet 2.

FIG. 7 shows an alternative realization of the magnetic test means of FIG. 1. A magnet 2′ located at the exterior sidewall of the coin channel 3 induces eddy currents to the coins rolling past there. A divertor 11 is placed next to the magnet 2′ in the coin way. As a coin rolls past the eddy current magnet 2′, a current which is a function of the resistivity and density of the coin is induced therein. Further, the velocity of the above coin as it leaves the eddy current test area is a direct function of the induced current. A coin leaving the above eddy current test area and striking on the divertor 11 follows the trajectory indicated by the arrow 0 or 0′ depending on its velocity at the moment of the impact. The coins following the trajectory 0 are normally routed to the above-mentioned acceptance means (not shown), whereas the coins following the trajectory 0′ are routed to the deflector 14 and next to the previously mentioned rejector (not shown).

It is to be noted that a strong magnet (not shown) is also associated to the above channel 3. This strong magnet is mounted near the corresponding to channel 3 calibrated coin inlet and retains the most magnetizable wrong coins. It is evident that the clearance bar 5 of FIG. 1 to 6 is no longer necessary for the eddy current magnet 2′ of FIG. 7, but a similar clearance bar (not shown) is now provided only for the above-mentioned strong magnet.

FIG. 8 and 9 show a cashbox box 15 which is associated to the above coin-operated apparatus. This coin cashbox 15 has three slots 20, 21 and 22 located at its upper side towards the left end through which coins of corresponding sizes, as coin 19 corresponding to the slot 20 may drop therein. Three deflecting flat members 16, 17, 18 are secured perpendicularly onto the rear vertical wall of the cashbox 15 and they are inclined towards the right end thereof. The above deflecting members 16, 17, 18 extend below the respective slots 20, 21, 22 at a certain distance therefrom in such that, a coin passing through a slot, e.g., coin 19 passing through slot 20, strikes on the respective deflecting flat member, e.g., member 16, and it is deviated to the right end of the cashbox, e.g., as it is indicated by the arrows *b* for coin 19. It is easy to understand that the storage capability of the above coin cashbox 15 is much larger than that of an equivalent conventional cashbox, i.e., not equipped with deflecting members. Indeed, for the latter conventional cashbox the coins cashed therein would form hills below the corresponding coin slots which increasing in height would disable at a certain moment the cashing of further coins despite the relatively large space still available. This drawback is avoided by the arrangement of FIG. 8 and 9, because the filling of the cashbox 15 starts from the right end of the box 15 and it progresses to the left end thereof, so that the capacity of the box 15 is efficiently used.

Referring to FIGS. 10 and 11, the coinbox telephone hook mechanism shown therein comprises two levers 24 and 25 pivotable around two respective fixed axles 31 and 28. The displacement of the lever 24 is delimitated by means of two stop pins 34, both for the rest condition in which the telephone handset 23 is hooked thereon (FIG. 10), as well as for the operated condition (FIG. 11) in which the handset 23 is removed therefrom. A snap-action spring 33 having one end hooked to a pin 36 of the lever 24 and the other end to a pin 38 of a fixed member 37 restores the lever 24 in the sense of the arrow *d*, the restoration force being lower than the weight of the handset 23. A spiral spring 26, concentrical to the axle 28 and having one end hooked to the lever 25 and the other end kept in a fixed angular position by a fixed pin 35 restores the lever 25 in the sense of the arrow *c*, thus constraining the lever 25 to rest against the lever 24 through its roller 32 and to follow the latter lever 24 in its pivotment. A counterweight 27 fixedly mounted to the upper side of the lever 25 communicates to this lever 25 a great moment of inertia. Two similar delayed closure mercury contacts 29 and 30 are secured on the lower part of the lever 25 in opposition with respect to each other. The above delayed closure mercury contacts 29 and 30 are well known in the art and FIG. 12 shows the constitution of such mercury contact. This mercury contact comprises a reservoir 39, containing a suitable quantity of mercury, a wide cross section tube 40 which carries two contact terminals 42 and 43, and a pipe 11 of relatively narrow cross section. The make condition of the contact is obtained by inclining it in the sense of the arrow 44. Then, the mercury flows into the tube 40 through the narrow pipe 11 and short circuits the terminals 42 and 43. Due to the narrow cross section of the pipe 11 and to the different levels at which the terminals 42 and 43 are fixed on the tube 40 with respect to its axis, a certain time interval elapses before the mercury contact makes, e.g., 1 to 2 seconds. The breaking of the above make contact takes place very quickly upon inclining it in the inverse sense, because the mercury, which was in the tube 40, flows from this tube 40 to the reservoir 39 via the wide cross section tube 40.

FIG. 13 shows the electrical arrangement of the above mercury contacts 29 and 30 in the circuit of a coin-operated telephone apparatus of the postpayment type, of which makes part the hook mechanism of FIGS. 10 and 11. The mercury contacts 29 and 30 of FIGS. 10 and 11, correspond to the make-and-break contacts *m*1 and *m*2 of the circuit of FIG. 13 respectively. The telephone circuit of the above apparatus, represented by the block TC, has two ends connected to the line conductors *b* and *a* directly and through the make-contact *m*1 in series with the parallel connection of dial-pulsing contact DIC and the break-contact of a coin changeover contact *cc* respectively. The connection of the make-contact *m*1 with the above parallel connection DIC/*cc* is connected to the line conductor *b* via a dial contact *h* which short circuits the receiver (not shown) during dialing. The fixed member of the make-contact of the coin changeover contact *cc* is connected to the line conductor *b* via the series connection of the break-mercury-contact $m_2$ and coin refund magnet P. For the rest condition of the previously mentioned hook mechanism (FIG. 10), the condition of the contacts *m*1, *m*2, *cc* is that shown in FIG. 13. Upon the handset 23 being unhung from the lever 24 the hook mechanism is brought to the operated condition (FIG. 11). The make-contact *m*1 (mercury contact 29) makes and the break-contact *m* 2 (mercury contact 30) breaks, the closure of the contact *m*1, which acts as a line contact being delayed with respect to the opening of the contact *m*2. The dial-pulsing contact DIC is short circuited by means of the break-contact of the coin changeover contact *cc* until the moment the required fee is paid. At that moment, the changeover contact *cc* changes its condition and the telephone dial is effectively operable. The connection with the called party being established, after a predetermined conversation time interval the central office sends to the pay station a warning signal inviting the customer to insert a new fee if he wishes to prolong his conversation for another time interval. If no new fee is paid, the conversation will be interrupted. In the case that the new fee is paid, this being acknowledged by a short pulse, e.g., of 20–25 milliseconds, sent from the pay station to the central office, the conversation time is prolonged. The coin collection takes place at the end of the conversation. The prolongation of the conversation time could fraudulously be obtained if the above short pulse had been produced by a short opening of the line contact *m*1 (29), e.g., by a quick and small movement of the lever 24. However, such a fraudulous operation of the contact *m*1 (29) cannot take place due to the great moment of inertia of the lever 25 and to its elastic coupling to the lever 24 causing a relatively large pivotment of the lever 25 for a quick and small movement of the lever 24 and a relatively long restoration time, so that the make-line-contact *m*1 (mercury contact 29) will be broken for a relatively long time, e.g., more than 500 millisecs, this signifying the conversation end. The break contact *m*2 (mercury contact 30) makes about 1 second after the breaking of the contact *m*1 (29), when hooking the handset 23 on the lever 24, and causes the energization of the coin refund magnet P which refunds the eventually redundant coins.

In the case that the above coin-operated telephone apparatus would be of the prepayment type, the second mercury contact 30 (*m*2) would no longer be necessary, since the refunding of the redundant coins might take place in a simple mechanical way, immediately at the end of the conversation.

Referring to FIG. 14 there is shown the circuitry of a coin-operated telephone apparatus of the prepayment and multimetering system type. The signalling and telephone circuits of the above apparatus are located above and below the dotted line *xx* of the FIG. 14 respectively. The signalling circuit includes a transformer T, of which the primary winding is tuned to the frequency of 50 c./s. through a capacitor C1 connected thereacross. One end of the parallel connection of the capacitor C1 and the primary winding of the transformer T is connected to the line conductor *a* through a make-telephone-hook-contact H2, whereas the other end of this parallel connection is connected to the cathode of a zener diode Z and to the emitter of a PNP-transistor Q. The secondary winding of the transformer T has its two ends connected to the two respective AC ends of a rectifying diode bridge D. The positive and negative rectifying ends of the diode bridge D are connected to the emitter and to the base of the transistor Q directly and through a resistor R5 respectively. The emitter and the base of the transistor Q are further connected to each other through a capacitor C2. The collector of the above transistor Q is connected to the anode of the zener diode Z through a relay K*r*. This relay K*r* has a make- and a break-contact *k*1 and *k*2, mounted as a make-before-break arrangement. The common member of the contacts *k*1, *k*2 is connected to the line conductor *b* and further connected to the other member of the contact *k*1 through a diode D3. The above other member of the make-contact *k*1 is connected to the movable member of a changeover coin contact *cc*, which makes part of a coin-collecting and coin value indicating arrangement U1. This arrangement U1 is followed by two other similar coin-collecting and coin value indicating arrangements U2 and U3. The fixed member of the make-contact of the changeover contact *cc* is connected to one end of a coin-collecting relay F*r* and to the fixed member of the make-contact of a changeover contact *f* of the coin-collecting relay F*r*. The fixed member of the break-contact of the contact *cc* is connected to the movable member of the contact *f*. The other end of the relay F*r* is connected to the respective other ends of the coin-collecting relays F′*r* and F″*r* of the arrangements U2 and U3. The fixed member of the break-contact of the changeover contact *f* is connected to the movable member of the coin changeover contact *cc*′ of the arrangement U2, and similarly the fixed member of the break-contact of the changeover contact *f*′ is connected to the movable member of the coin changeover contact *cc*″ of the arrangement U3. The fixed member of the break-contact of the changeover contact *f*″ is connected, on the one hand to the parallel connection of the above-mentioned other ends of the relays F*r*, F′*r*, F″*r* through the parallel connection of a diode D2, a resistor R2 and a capacitor C3 in series connection with a diode D1, and on the other hand to the line conductor *b* through the series connection of a make-telephone-hook-contact H1, the pulsing contact of the dial DI and the break-contact *k*2. The connection of the anode of the zener diode Z and the relay K*r* is connected to the fixed member of the break-contact of the changeover contact *f*″ through the series connection of a symmetrical varistor W1 and a resistor R4, the junction point of which is connected to the line conductor *b* through the series connection of a capacitor C4 and the break-contact *k*2. Three capacitors C5, C6, C7 are connected across the windings of the coin-collecting relays F*r*, F′*r*, F″*r* respectively, for delaying their release. The telephone circuit of which make part the above elements W1, R4, C4, H1 and H2, is substantially similar to that disclosed in the Belgian Pat. No. 505,815. This telephone circuit includes a receiver F and a microphone M which are arranged in an antilocal effect circuit through the four induction coils L1 to L4. The anode of the zener diode Z is connected to a common connection point of the microphone M and the receiver F through the coil L4, whereas the other end of the microphone M is connected to one end of a resistor R3, the other end of the resistor R3 being connected to the anode of the diode D1 through the coil L1. The coil L2 has one end connected to the junction point of the resistor R3 and the coil L1, and its other end connected to one end of the parallel connection of a symmetrical varistor W2 and a capacitor C9. The other end of the latter parallel connection W2/C9 is connected to the common junction point of the receiver F and the microphone M and to the junction point of a symmetrical varistor W3 and a resistor R1. The other ends of the varistor W3 and the resistor R1 are connected to each other via the coil L3. The junction point of the coil L3 and the varistor W3 is connected to the free end of the receiver F and the junction point of the coil L3 and the resistor R1 to the above other end of the coil L2 through a capacitor C8. The receiver F is further shunted by a contact of the dial DI, which short circuits the receiver F when dialing. As it has previously been mentioned the above telephone circuit is known in the art and its operation principle is described in the relative Belgian Pat. No. 505,815. Hence, only the principle of operation of the associated signalling system (FIG. 14) will hereinafter be described.

In multimetering system areas, the conversation time is divided in periods the duration of which depends on the distance involved. The fee of each period is always the same. The above pay station operates in connection with an adapter (not shown) located in the central office. This adapter sends to the pay station the coin collection pulses at the start of each or of certain periods, as it will later be described, and receives the coin value pulses sent from the pay station in response to the above coin collection pulses. The pay station of the present embodiment accepts three kinds of coins of different values to which are associated the respective three coin-collecting and coin value indicating arrangements U1, U2 and U3. A lowest value coin corresponds to the fee of one conversation period, a next value coin to the fee of *m* periods and a highest value coin to the fee of *n* conversation periods ($n>m$).

The operation principle of the above signalling system is as follows:

Upon unhunging the telephone handset the hook contacts H1 and H2 make. The line conductors *a* and *b* are then at a negative and a positive potential respectively. The zener diode Z being biassed in the forward direction, no potential drop appears thereacross. The pulsing contact of the dial D1 is short circuited, i.e., ineffective, due to the positive potential of the line conductor *b* being applied to both its contact members through on the one hand the conductive diode D3 and the cascaded arrangement of the closed break contacts of the changeover contacts *cc*, *f*, *cc'*, *f'*, *cc''* and the closed make-hook-contact H1, and on the other hand the closed break-contact *K*2. This short circuit condition of the above pulsing contact is removed as soon as one of the changeover contacts *cc*, *cc'*, *cc''* changes its condition following to the introduction in the corresponding coin channel of a lowest, an intermediate, or a highest value coin, respectively. For explanation purposes it is assumed that coins of all the above three values are present and also that the coin collection starts with the lowest value coins and continues with the intermediate value coins when all the lowest value coins are collected, and the same for the intermediate and highest value coins. At the answer of the called party the polarity of the line is reversed, i.e., line conductor *a* is brought at a positive potential and line conductor *b* at a negative one, and the central office (not shown) sends to the pay station a coin collection pulse. This collection pulse is constituted by a 50-c./s. AC pulse having a duration of at least 300 milliseconds and a very low level, e.g., 8 volts, this AC pulse being superposed on the DC loading of the line conductors *a*, *b*, i.e., without ground return. The above collection pulse is received by the transformer T, the voltage on the secondary of transformer T is rectified by the diode bridge D and the negative rectified output is applied to the base of the transistor Q via resistor R5, so that the transistor Q becomes conductive. The biassing voltage of the transistor Q is supplied by the zener diode Z, which after the above line polarity reversal establishes a difference of potential between the emitter and collector electrodes of the transistor Q, equal to the diode Z breakdown voltage. In this way, the current flowing in the collector of transistor Q, operated as above, is independent from the line loop resistance. The collector current of the transistor Q energizes the relay K*r* and due to this the make-before-break contact arrangement *k*1/*k*2 operates and puts the coin-collecting and coin value indicating chain U1, U2, U3 in the loop. The lowest-value coin-collecting relay F*r* is thus energized and the changeover contact *f* changes its condition. The energization of the relay F*r* causes the collection of a lowest value coin and following to this the changeover contact *cc* changes its condition once in a manner which will later be described, thereby one pulse is sent back to the central office for indicating that a lowest value coin has been collected. The central office continues to send one coin collection pulse at the start of each conversation period until all the lowest value coins are collected. From that moment, the coin changeover contact *cc* assumes its rest condition and the following coin collection pulse causes the energization of the relay F'*r* and the condition change of the changeover contact *f'*, hence the collection of an intermediate value coin. The coin changeover contact *cc'* changes its condition in such a manner, that two pulses are sent back to the central office for indicating that an intermediate value coin has been collected. The following *m*−1 coin collection pulses are not sent to the pay station, since the intermediate coin value is *m* times the lowest coin value. The central office continues to send one coin collection pulse at the start of each $m^{th}$ conversation period until all the intermediate value coins are collected. From that moment, the coin changeover contact *cc'* assumes its rest condition and the following coin collection pulse causes the energization of the relay F''*r* and the condition change of the changeover contact *f''*, hence the collection of a highest value coin. The coin changeover contact *cc''* changes its condition in such a manner, that three pulses are sent back to the central office for indicating that a highest value coin has been collected. The following *n*−1 coin collection pulses are not sent to the pay station, since the highest coin value is *n* times the lowest coin value. When the last highest value coin is collected, the next coin collection pulse sent from the central office to the pay station is not answered and the central office then sends to the pay station a warning signal, e.g., during 5 seconds, for inviting the user to insert further coins if he wishes to prolong his conversation. At the end of the above 5 seconds, a new coin collection pulse is sent to the pay station. In case that an answer is sent back to the central office, i.e., coin value indicating pulse(s), the conversation time is prolonged as previously described; if no answer is sent back, the pay station telephone connection is cut off. As it has previously been mentioned the coin collection pulses sent from the central office to the pay station have a very low level (8 volts AC). In this way disturbance of the conversation during coin collection is avoided. Moreover the operation reliability of the relay K*r*, energized by the collector current of the transistor Q, is ensured through resistor R5, which prevents the quick loading of the capacitor C2, so that the transistor Q and its associated relay K*r* cannot be activated by clicks on the line generally having a short duration. It is also to be noted, that the line polarity reversal which has previously been assumed to take place at the answer of the called party, is not necessary for the operation of the above pay station which could as well operate in a system without polarity reversal. In the latter case, in which the line conductors *a* and *b* will permanently be at a positive and a negative potential respectively, it is advantageous to shunt the zener diode Z by an additional dial contact (not shown). This additional dial contact short circuits the zener diode Z when dialling in order to prevent the energization of the relay K*r* by the dialling pulses. In the above case of no line polarity reversal the diodes D1 and D7 may be suppressed from the signalling circuit. Indeed, the role of the diode D1 was to prevent the energization of the relays F*r*, F'*r* and F''*r* at the occurrence of the line polarity reversal, whereas the role of the diode D7, conductive before the line polarity reversal, was to provide a path for short circuiting the dial pulsing contact in the absence of coins, as previously described. In the absence of line polarity reversal, the above short circuit condition of the dial pulsing contact must be realized in a different way.

Figure 15:
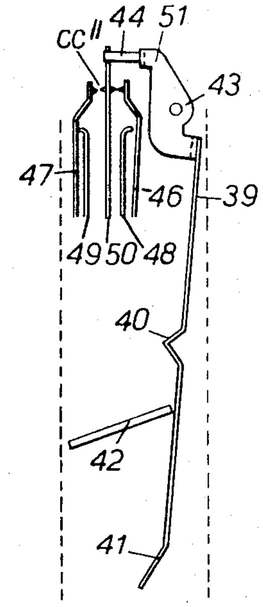
Figure 16:
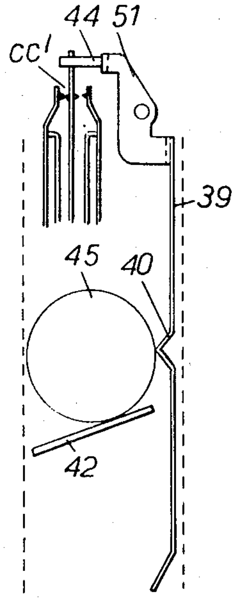
Figure 17:
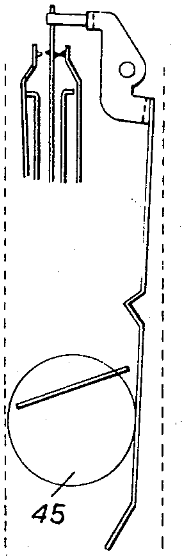
Figure 18:
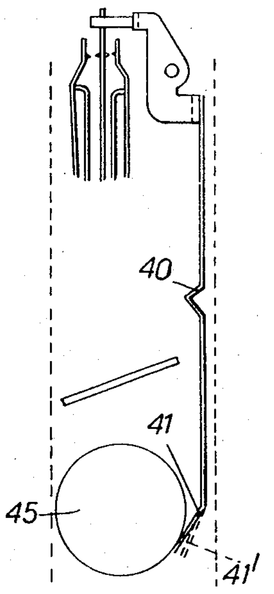
Figure 19:
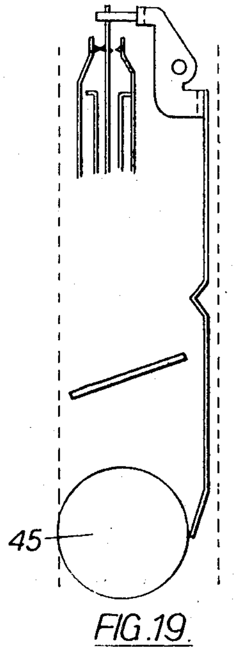

FIG. 15 schematically shows a preferred realization of the coin changeover contact *cc''* (FIG. 14) and of the associated thereto coin value indicating means. The contact *cc''* has its fixed members 46 and 47 supported by the respective springs 48 and 49 and its movable member 50 resting against the upper part 51 of a pulsing arm 39 through a projection 44. The pulsing arm 39 which is pivotable around a fixed axle 43 carries two pulsing projections 40 and 41 in the coin chute way indicated in dotted lines. A stop projection 42, controlable by the coin-collecting relay F''*r* (FIG. 14), protrudes in the coin chute way in order to stop a coin 45 (FIG. 16) operating the coin changeover contact *cc''* at a suitable position. In this position the coin 45 resting against the pulsing projection 40 pivots the pulsing arm 39, so that the upper part 51 thereof pushes the movable member 50 against the fixed member 47 through the projection 44 and it causes the condition change of the changeover contact *cc''*. Upon the coin collecting relay F''*r* (FIG. 14) being energized in the manner previously described, the stop projection 42 is removed from the coin chute way and the coin 45 falls to the cashbox (not shown) associated to the pay station, which may advantageously be constituted by the cashbox 15 of FIGS. 8 and 9. FIGS. 17 to 19 show three characteristic conditions of the changeover contact *cc''*, which correspond to three positions of the coin 45 in its chute way to the above cashbox. Upon the coin 45 leaving the pulsing projection 40 in its chute, the pulsing arm 39 stops its pushing action on the movable contact member 50 which is thus released and comes back against the fixed member 46 of the break-contact of the changeover contact *cc''* (FIG. 17). The travelling time of the movable contact member 50 from the condition of FIG. 16 to the condition of FIG. 17 constitutes the duration of the first coin value indicating pulse sent to the central office, e.g., 25 milliseconds. The coin contact cc'' assumes its condition of FIG. 17 during an equal to the above time interval (25 milliseconds), until the falling coin 45 strikes on the second pulsing projection 41 (FIG. 18). At that moment the movable contact member 50 is pushed towards the fixed member 47 of the make contact of the changeover contact cc'' and it comes against it (FIG. 18). The travelling time of the movable member 50 from the condition of FIG. 17 to the condition of FIG. 19 constitutes the duration of the second coin value indicating pulse sent to the central office e.g., again 25 milliseconds. The third coin value indicating pulse is produced when the coin 45 leaves the second projection 41. Then, the contact member 50 is again released and comes against the fixed member 46 of the break-contact of the changeover contact cc'' (FIG. 15). Its travelling time, equal to the above ones, e.g., 25 milliseconds, constitutes the duration of the third coin value indicating pulse sent to the central office for acknowledging that a highest value coin has been cashed. After the above coin 45 has been cashed and the relay F''r released the stop member 42 comes back into the coin chute way and then another coin may again operate the contact cc''. This new coin will be collected in the same as the above manner at the next coin collection pulse. It is easy now to understand how the coin value indicating means associated to the other coin changeover contacts cc and cc' are constituted. The pulsing arm associated to the changeover contact cc' is similar to the pulsing arm 39 associated to the contact cc'', but it has its second pulsing projection attenuated, as indicated by 41' in FIG. 17, so that for the extreme coin position (FIG. 19) with respect to the pulsing arm 39 in its coin chute, the movable member of the changeover contact cc' does not come against the fixed member of the make-contact thereof. It is now evident that the pulsing arm associated to the changeover contact cc carries only one pulsing projection, similar to the projection 40 of the pulsing arm 39 of the contact cc''.

While the principles of the invention have been described above in connection with specific apparatus, it is to be clearly understood that this description is made only by way of example and not as a limitation on the scope of the invention.

We claim:

1. Signalling system, for controlling a telephone pay station, comprising a signal receiver network at said station receptive of control signals from a signal transmitter through a DC loaded telephone conversation transmission path, said receiver including an impedance of constant voltage characteristic in series with the low DC impedance input of a said receiver network comprising a transformer connected to prevent a DC coupling between the transformer input and its output in said transmission path and a bistable device coupled across said impedance of constant voltage characteristic through a normally nonconductive switching transistor, which is operable in response to a pulse output received from said network, and that upon a payment needed, low voltage signal being received by said receiver from said transmitter, said transistor is operated to activate said bistable device by a current flow which is independent of the path loop resistance thereby to implement the collection of payment.

2. Signalling system as claimed in claim 1, characterized in this, that said signal from said transmitter is a low-amplitude AC signal of predetermined frequency and duration and is applied to said receiver through two conductors of said line, and means in said network tuned to the frequency of said AC signal.

3. Signalling system as claimed in claim 2, characterized in this, that said transistor device has a first, a second and a third, electrode, said second and said third electrodes being connected to two ends of said impedance of constant voltage characteristic directly and via said bistable device respectively, said second and said first electrodes being further connected to the output of said network via a rectifying smoothing arrangement.

* * * * *